Patented May 29, 1934

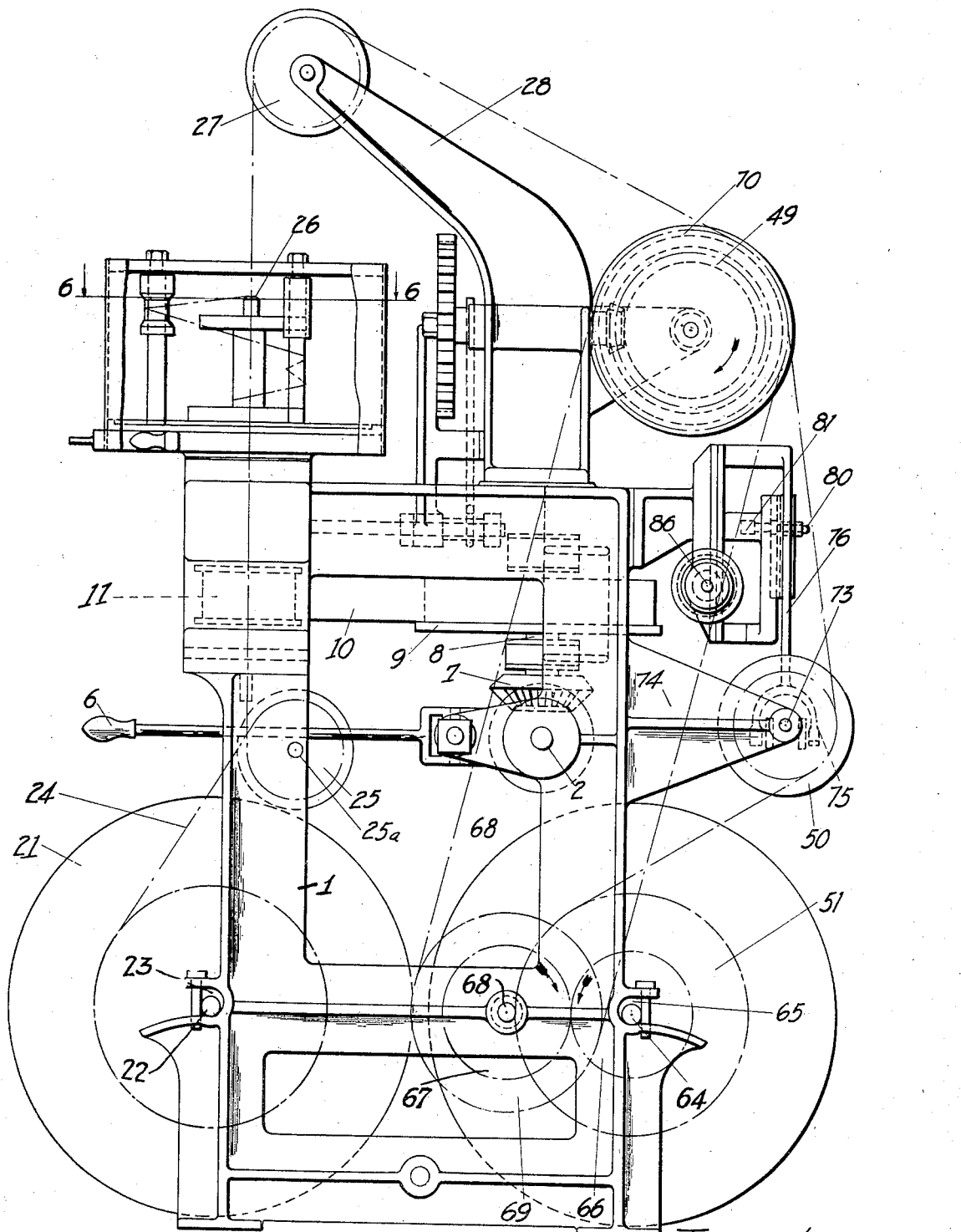

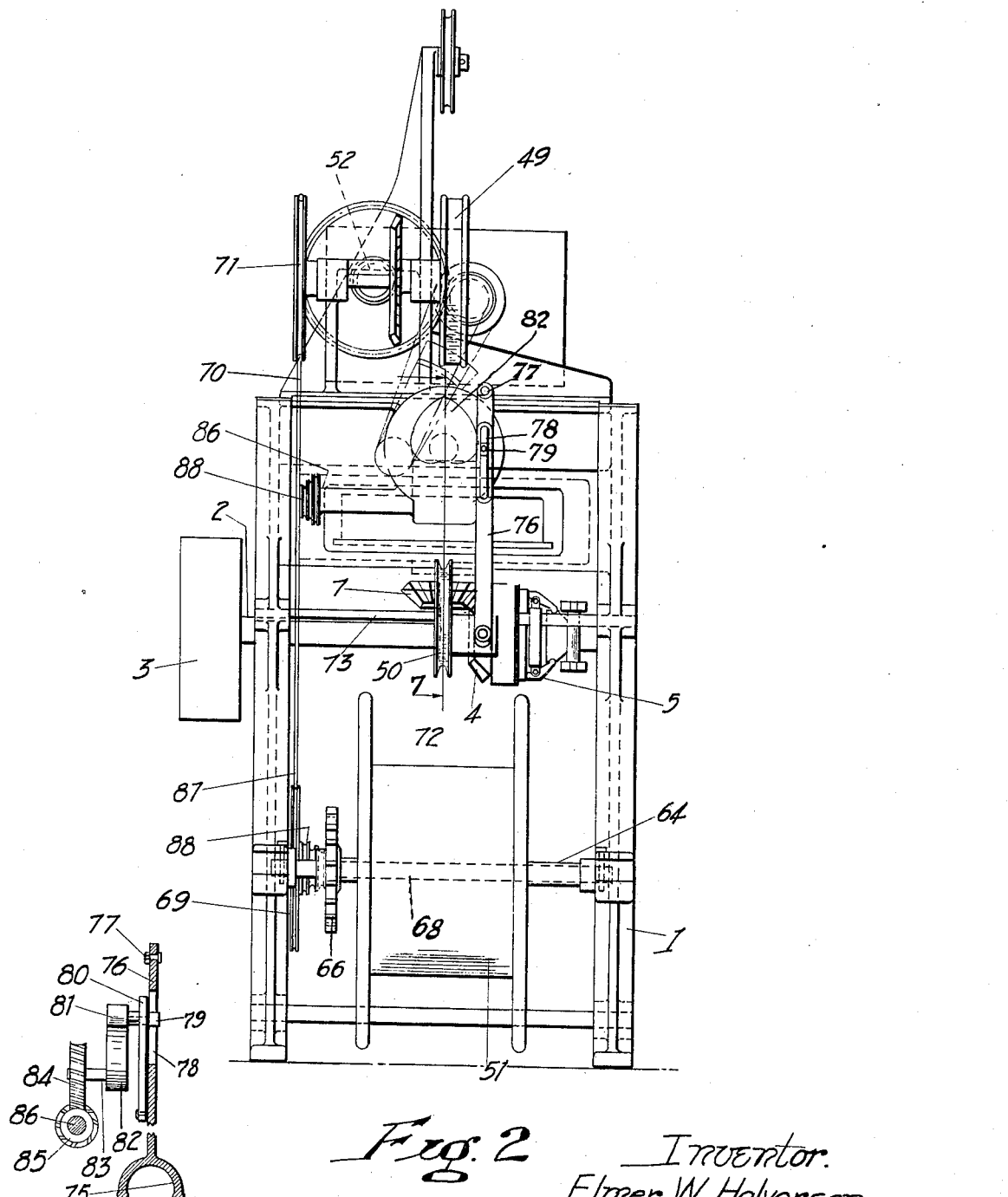

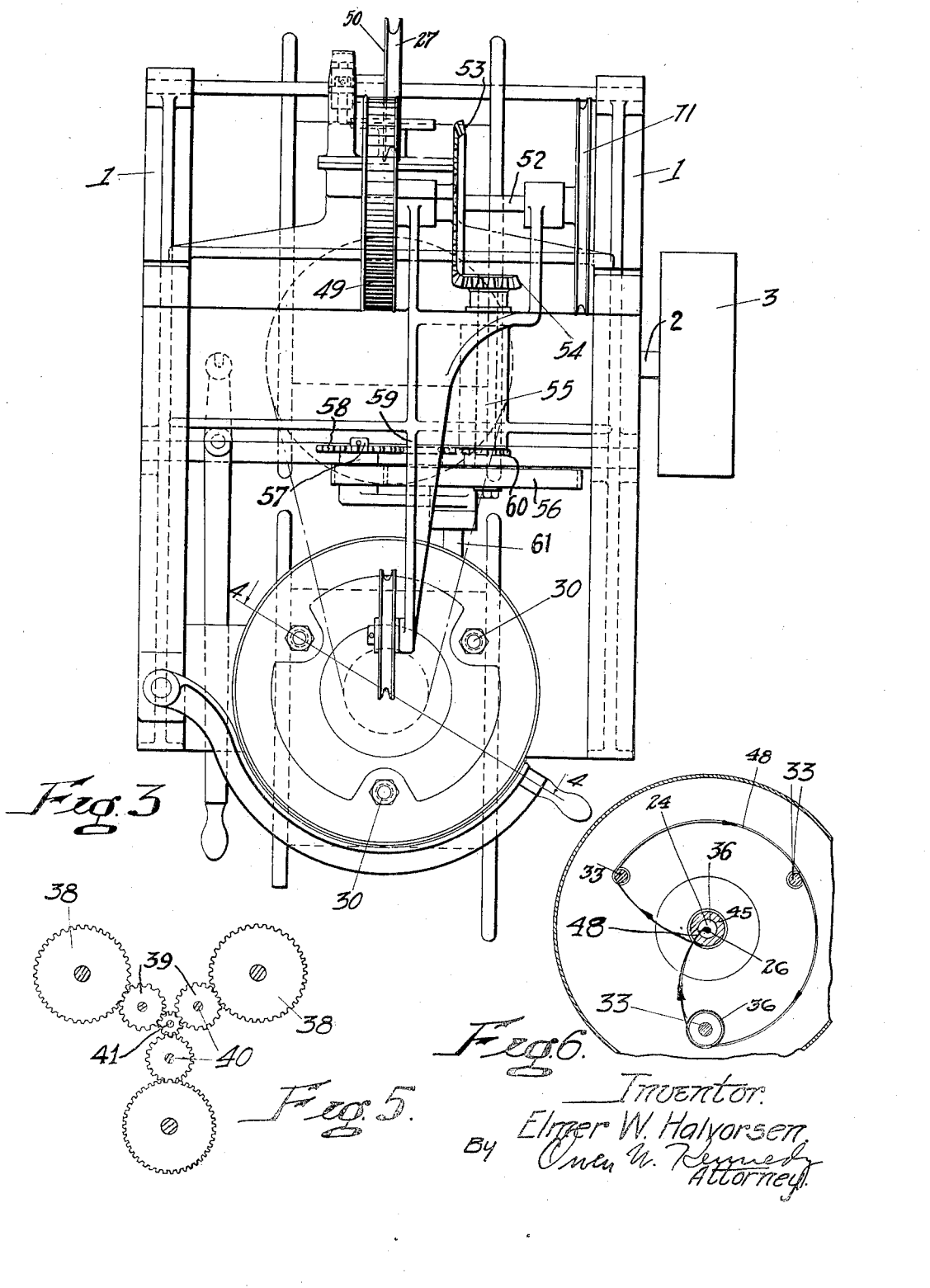

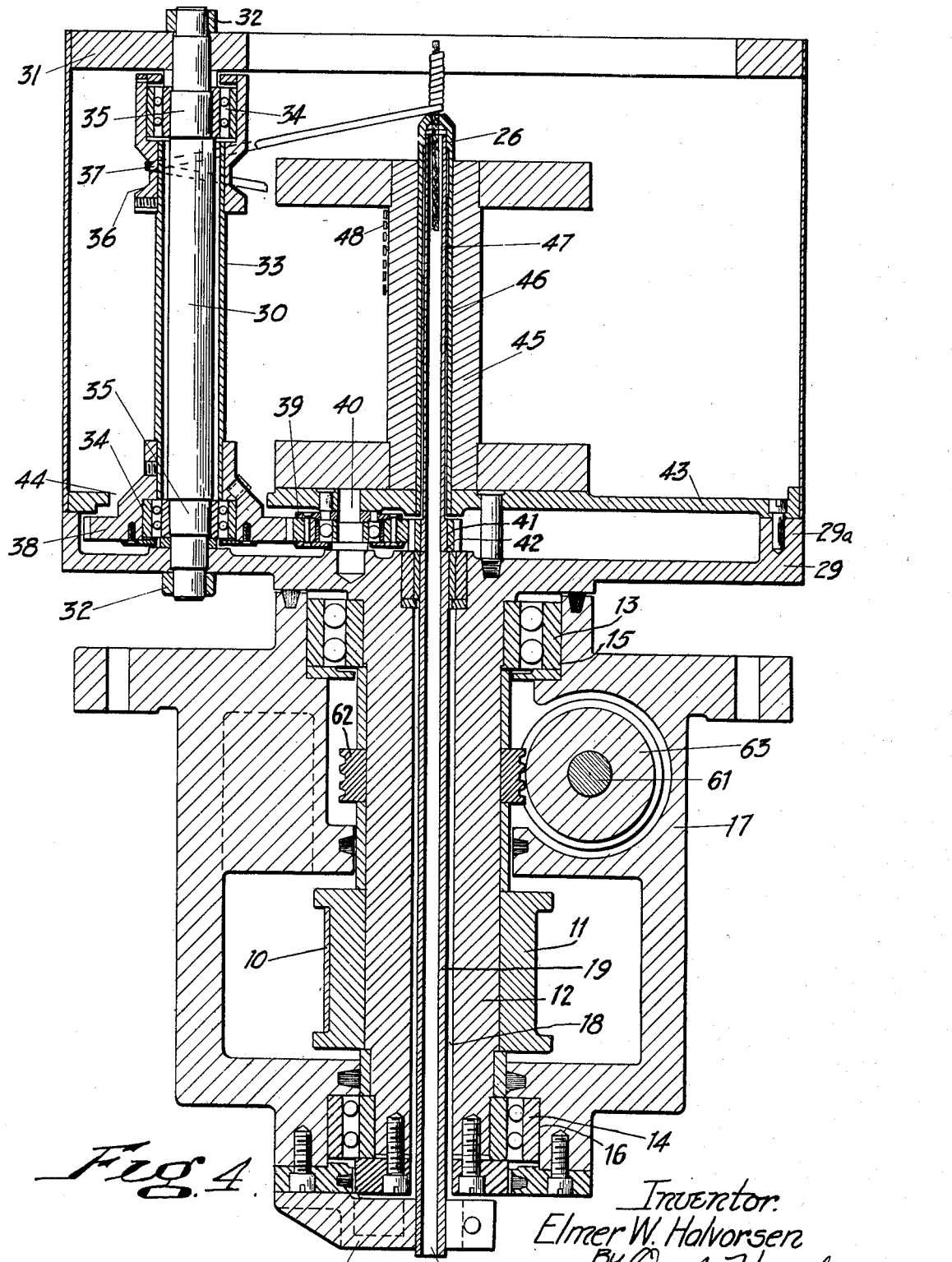

1,960,741

UNITED STATES PATENT OFFICE 1,960,741

CABLE ARMORING MACHINE

Elmer W. Halvorsen, Worcester, Mass., assignor to Sleeper & Hartley, Inc., Worcester, Mass., a corporation of Massachusetts Application September 22, 1930, Serial No. 483,736

2 Claims. (Cl. 117—41)

The present invention relates to a machine for winding metallic strip about a flexible core or cable for the purpose of forming a protective cover or armor entirely surrounding the core, the machine being particularly adapted to armor electrical conductors having insulating covering of compressible material, such as rubber.

The object of the invention is to provide a machine of the above indicated character that is adapted to produce armored cable at a high rate of production as compared to machines heretofore constructed for a like purpose. A further object of the invention is to provide a machine which is adapted to wind the metallic armoring strip about the insulated wire core in such a manner that the insulating material surrounding the core is not compressed to any appreciable extent, the armor being in the form of a continuous tube, more or less loosely inclosing the insulated core. Consequently, armored electrical conductors produced by the operation of the machine possess a high degree of strength and durability, without exhibiting any impairment of the insulating properties of the conductor, such as would be caused by compression or pinching of the insulating material by the armoring strip. The above and other advantageous features of the invention will hereinafter more fully appear with reference to the accompanying drawings, in which—

Fig. 1 is a view in side elevation of a machine embodying the invention.

Fig. 2 is a view in rear elevation of the machine shown in Fig. 1, looking from the right.

Fig. 3 is a plan view of the machine shown in Fig. 1.

Fig. 4 is a vertical sectional view, on an enlarged scale, of the flier of the machine, the section being taken along the line 4—4 of Fig. 3 looking in the direction of the arrows.

Fig. 5 is a diagrammatic view of the gearing of the flier.

Fig. 6 is a fragmentary sectional view along the line 6—6 of Fig. 1, looking in the direction of the arrows.

Fig. 7 is a fragmentary sectional view along the line 7—7 of Fig. 2, looking in the direction of the arrows.

Like reference characters refer to like parts throughout the figures.

Referring first to Figs. 1 and 2 the machine provides frame members 1, 1 between which is rotatably supported a driving shaft 2 adapted to be driven from any suitable source of power, not shown, by means of a pulley 3. The shaft 2 carries a bevel gear 4 adapted to be operatively connected to the shaft 2 by means of a clutch 5, of any suitable type. The clutch 5 is adapted to be operated by means of a lever 6, best shown in Fig. 1, whereby the gear 4 may be connected, or disconnected, at will from the rotatably driven power shaft 2. The bevel gear 4 is in mesh with a bevel gear 7 mounted on a vertical countershaft 8 which carries a pulley 9 connected by a belt 10 to a pulley 11 by means of which the flier and other parts of the machine are adapted to be driven in unison.

Referring now to Fig. 4, the flier is shown as comprising a sleeve 12 rotatably supported about a vertical axis in anti-friction bearings 13 and 14 received in seats 15 and 16 provided by a housing 17 rigidly secured to a frame member 1. The pulley 11 driven by the belt 10 is keyed, or otherwise secured, to the sleeve 12, so that the whole flier structure is adapted to be rotatably driven about a vertical axis. The sleeve 12 provides a central longitudinal opening 18 within which is received a guide tube 19 that is non-rotatably supported within the sleeve opening 18 by means of a bracket 20 attached to the housing 17, the bracket 20 serving to center the tube 19 within the opening 18 and hold it free from the walls thereof.

As best shown in Fig. 1, a reel 21 is rotatably supported between the spaced frame members 1 below the flier, on a shaft 22 freely turnable in seats 23 provided by the frame. The cable or core material 24 which it is desired to armor is led upwardly from the supply reel 21 around a drum 25 mounted on a shaft 25a parallel to reel shaft 22 and frictionally restrained against free rotation, so as to impose a tension on the core material as drawn from the reel. After passing around the drum 25, the core material 24 leads tangentially therefrom into the stationary guide tube 19 of the flier structure through which it passes upward through a winding nose 26, carried by the upper end of the tube 19, to a guide pulley 27 freely rotatable on a bracket 28. The core material 24 is adapted to be drawn upwardly through the stationary guide tube 19, but before proceeding with a detailed description of the mechanism whereby the core material is moved, there will be first described the manner in which metallic strip material is wound around the core material 24 as it emerges from the nose 26.

Referring again to Fig. 4, the flier sleeve 12 provides a flange 29 carrying a number of upwardly extending shafts 30 arranged symmetrically around the axis of rotation of the flier, as shown in Fig. 3. The upper ends of the shafts 30 are received in a plate 31 and the shafts 30 are non-rotatably clamped between the flange 29 and the plate 31 by means of lock nuts 32. Each shaft 30 is surrounded by a sleeve 33 rotatably supported on its shaft by anti-friction bearings 34, 34 surrounding seats 35 provided at the ends of the shafts. One sleeve 33 carries at its upper end a drum 36 providing a groove 37, and the lower end of each sleeve carries a gear 38, surrounding lower bearing 34. The gear 38 of each sleeve 33 is in mesh with a gear 39 freely rotatable on a stationary stud 40 carried by the flange 29 and all the intermediate gears 39 are in mesh with a pinion 41 rigidly mounted on a seat 42 provided by the stationary guide tube 19. The above described arrangement of gearing is shown diagrammatically in Fig. 5, from which it is evident that when the flier sleeve 12 is driven by the belt 10 on the pulley 11, the engagement of the intermediate gears 39 with the stationary pinion 41 will cause the gears 38 to be driven in unison and impart rotative movement to the several sleeves 33.

The flange 29 provides an annular rim 29a which serves to support a spool plate 43 above the gears 39 and pinion 41, the plate 43 providing a number of openings 44 through which the sleeves 33 extend. The plate 43 serves to support a spool 45, the barrel portion of which provides a central opening 46 for loosely receiving a sleeve 47 turnable with the plate 43. The sleeve 47 is spaced from the guide tube 19 and serves to center the spool 45 about the axis of rotation of the flier. The spool 45 carries a supply of flexible metallic strip material 48 which, as best shown in Fig. 6, is led from the spool around two of the rotatably driven sleeves 33 and from thence around the drum 36. The groove 37 serves to hold the strip material 48 on the drum 36 and to direct it to the winding nose 26 at the point where the core material 24 emerges from the nose. With the above described disposition of the strip material 48, it is evident that rotation of the flier will be accompanied by simultaneous rotation of the sleeves 33 so that the strip 48 will be drawn from the spool 45 at the same time that rotation of the drum 36 about the stationary nose 26 will serve to wind the strip 48 in the form of a tube about the core material 24 as the latter is drawn upwardly out of the nose 26. As indicated diagrammatically in Fig. 6, the rotation of the sleeves 33 and the drum 36 causes the strip material 48 to be fed to the nose 26 at a rate slightly in excess of the rate of winding at the nose 26, so that the material 48 having an appreciable amount of inherent stiffness tends to bulge outward between the nose 26 and the periphery of the drum 36. Furthermore, centrifugal force adds to the bulging effect, so that the strip 48 is wound in tubular form about the core material 24, without any appreciable tension thereon and without any tendency for the strip material 48 to be wound so closely on the core 24 as to compress or injure an insulating covering thereon. In effect, the strip feeding sleeves or rolls 33 act as capstans, since the wrapping of the strip 48 around the rolls 33 creates a friction proportional to the number of turns of strip around each roll. Because of this capstan effect, the tension in the strip at the point of winding can be closely controlled by varying the number of turns around the rolls.

The drum 36, being larger in diameter than the rolls 33, has a greater surface speed and accordingly maintains a tension on the strip material between said drum and the rolls 33 over which the strip material is passed to maintain a constant feeding movement of said strip in response to the rotation of the rolls 33. The rate of feed of the strip, as determined by the rotation of the rolls 33, is slightly in excess of the rate of winding of the nose 36, that is, slightly greater than the surface speed of the core relative to the flier, so that the strip material is wound under substantially no tension and as a result forms a loose winding for the core. The drum 36 by its higher surface speed aids in feeding the strip material toward the nose, thereby reducing the tension on said strip material between said drum and the core.

As best shown in Fig. 1, the armored cable produced by the operation of the flier, as previously described, after passing over the guide pulley 27 passes downwardly to a traction drum 49 around which several turns of the cable are wound before passing downwardly around a traversing pulley 50 and take-up reel 51. As best shown in Fig. 3, the traction drum 49 is carried at one end of a shaft 52, the other end of which carries a bevel gear 53 in mesh with a bevel pinion 54. The pinion 54 is mounted on a shaft 55 which is connected by gearing 56 to a shaft 57 carrying a sprocket wheel 58. The sprocket wheel 58 is connected by a chain 59 to a sprocket wheel 60 on a shaft 61 extending at right angles to the flier sleeve 12 and driven therefrom by means of a worm 62 mounted on the sleeve 12, and worm wheel 63 mounted on the shaft 61, see Fig. 4. Consequently, rotation of the flier 12 causes simultaneous rotative movement to be imparted to the drum 49, and the relation between the gearing between the sleeve 12 and drum 49 is such that the armored cable is drawn onto the drum at substantially the same rate at which rotation of the flier causes the strip material 48 to be wound into a tube inclosing the core material 24.

As previously pointed out, the armored cable passes downwardly from the drum 49 around a traversing pulley 50 to a take-up reel 51 and the reel 51 is driven in unison with the drum 49. The take-up reel 51 is mounted on a shaft 64 rotatably supported in seats 65 provided by the brackets 1, and this shaft 64 carries a gear 66 in mesh with a gear 67 mounted on a countershaft 68. As best shown in Fig. 2, the take-up reel shaft 68 carries a pulley 69 connected by a belt 70 to a pulley 71 mounted on the shaft 52 which carries the traction drum 49. The pulleys 69 and 71 are of such diameter that the take-up reel 51 always tends to rotate at a greater speed than the traction drum 49, the belt 70 slipping. The speed of the take-up reel must be great enough to wind the cable when the reel is empty and as the diameter of the wound material increases, the slippage of the belt 70 increases, proportionately.

As the armored cable is wound on the take-up reel 51, it is led back and forth on the reel by means of the traversing pulley 50. The pulley 50 is carried by a sleeve 72 slidably mounted on a shaft 73 extending parallel to the take-up reel shaft 64 and supported above the same by a bracket 74, see Fig. 1. The sleeve 72 is embraced by a forked portion 75 at the end of a traversing lever 76 turning of the lever 76 being adapted to shift the pulley 50 on the shaft 73. As best shown in Fig. 2, the upper end of the traversing lever 76 is mounted on a pivot 77 and a slot 78 is provided in the lever 76 for slidably receiving a block 79. The block 79 is also carried by a second lever 80 behind the lever 76 on which lever 80 is mounted a roll 81 bearing on the face of a traversing cam 82, as best shown in the fragmentary sectional view of Fig. 7. The block 79, slidable in both levers 76 and 80 permits adjustment of the throw of the traversing pulley 50 without changing the cam 82. The cam 82 is mounted on a shaft 83 carrying a worm wheel 84 in mesh with a worm 85 carried on a shaft 86 extending parallel to the countershaft 68. The shaft 86 is driven from the shaft 68 by means of a belt 87 passing around stepped pulleys 88 mounted on the shafts 86 and 68, respectively. By reason of the above described driving arrangement, it is apparent that the rotation of the shaft 68 which drives the take-up reel 51 is accompanied by rotation of the cam 82, thereby imparting a back and forth movement to the pulley 50 to cause the armored cable to be evenly distributed on the reel 51 as it is wound thereon.

From the foregoing, it is apparent that by the present invention there is provided a machine that is adapted to wind metal strip about a flexible core to form a protective covering, or armor. During the winding operation, the strip material is fed to the winding nose at such a rate that the strip is not subjected to any pull which would tend to cause the strip to closely compress the core material and thus damage the same, as when the core is covered with compressible material such as rubber insulation. In addition, the machine provides a traction cylinder and take-up reel rotatably driven in unison with the flier so that the armored cable is drawn from the flier at the proper rate with no slack therein.

I claim,

1. In a cable wrapping machine, the combination with a hollow stationary guide, and means for drawing flexible core material through said guide, of a flier rotatably mounted about the axis of said guide and carrying a freely supported supply of flexible strip material surrounding said guide and a group of rotatably driven rolls around certain of which the strip material is wrapped in passing from said supply to the end of said guide, and means for driving all of said rolls at the same rotational speed, the last roll over which said strip passes having at least a portion thereof of a larger diameter than the other rolls, with said strip passing over said larger diameter portion, thereby maintaining a tension on the strip material between said roll and the preceding rolls.

2. In a cable wrapping machine, the combination with a hollow stationary guide, and means for drawing flexible core material through said guide, of a flier rotatably mounted about the axis of said guide and carrying a freely supported supply of flexible strip material surrounding said guide and a group of rotatably driven rolls around certain of which the strip material is wrapped in passing from said supply to the end of said guide, and means for driving all of said rolls at the same rotational speed, the last roll over which said strip passes having a portion of larger diameter than the preceding rolls, with said strip passing over said portion, thereby maintaining a tension on said strip between said last roll and the preceding rolls to procure a positive feeding movement of said strip in response to rotation of said preceding rolls.

ELMER W. HALVORSEN.